E. MORRIS.
Saw.

No. 227,815.        Patented May 18, 1880.

Witnesses:
James H. Webb,
Philip Robinson.

Inventor:
Eli Morris.

UNITED STATES PATENT OFFICE.

ELI MORRIS, OF NEW HAVEN, CONNECTICUT.

SAW.

SPECIFICATION forming part of Letters Patent No. 227,815, dated May 18, 1880.

Application filed March 23, 1880. (No model.)

*To all whom it may concern:*

Be it known that I, ELI MORRIS, of the town of New Haven and State of Connecticut, have invented a new and useful Improvement in Saws, of which the following is a specification.

My invention relates to the construction and arrangement of saw-teeth in crosscutting-saws; and it consists in the construction of saw-teeth of a peculiar form, and the arrangement of such teeth upon the saw-blade in a peculiar manner.

Figure 1:
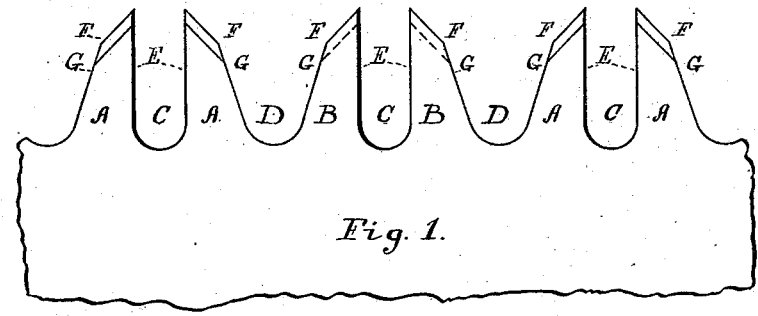
Figure 2:
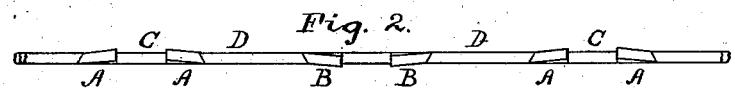

In the accompanying drawings, which are a part of this specification, Figure 1 is a side view, and Fig. 2 is a top view, of a portion of my saw.

The letters A and B represent the teeth of the saw. The letters C and D represent the dust-spaces. The letter E represents the perpendicular square edges of the teeth. The letter F represents the beveled slope of the teeth, and the letter G represents the square-edged slope of the teeth.

From these drawings it will be seen that the teeth of my saw are single teeth, quite long in proportion to their width; that they each have one perpendicular square edge, E, running from the point of the tooth to the body of the saw, and that the other edge of the tooth is composed in part of the beveled slope F and in part of the square-edged slope G, which runs from the lower termination of the beveled slope to the body of the saw. It will also be seen that I arrange these teeth upon the blade of the saw in such a manner that the perpendicular square edges E face each other on each side of the deep and narrow dust-space C, and that their sloping edges F G face each other on each side of the equally deep but wider dust-space D. It will also be seen that the two teeth A and A, which inclose the first narrow dust-space C, are beveled alike and set to one side of the saw; that the next two teeth B and B are beveled alike, but directly opposite to A and A, and are set to the opposite side of the saw; that the third two teeth A and A are beveled and set like the first two teeth A and A; that the fourth two teeth will be beveled and set like B and B, and so on alternately the whole length of the blade.

By this construction and arrangement I largely increase the number and efficiency of the teeth on any given length of saw. I secure ample dust-space on each side of every tooth, and produce a saw which cuts rapidly, runs easier and smoother than any now in use, entirely clears itself of dust, and is kept in good repair with very little trouble.

Having thus described my invention, what I claim as new, and desire to secure by Letters Patent, is—

In a crosscutting-saw, the teeth A and B, constructed with one perpendicular square edge, E, running from the point of the tooth to the body of the saw, and with one sloping edge, composed in part of the beveled slope F next the point of the tooth and in part of the square-edged slope G, running from the lower termination of the beveled slope to the body of the saw, and arranged upon the blade with the perpendicular square edges E facing each other on each side of the dust-space C, and with the sloping edges F G facing each other on each side of the dust-space D, and having the teeth A A beveled on the same side of the teeth and set to one side of the saw, and the teeth B B beveled on the opposite side of the teeth and set to the opposite side of the saw, and so on alternately through the entire length of the saw, substantially as shown and described.

ELI MORRIS.

Witnesses:
CHARLES R. WHEDON,
CHARLES L. SWAN, Jr.